INVENTOR
DAVID T. AYERS JR.
BY John H. Phillips
ATTORNEY

July 29, 1958  D. T. AYERS, JR  2,844,941
BOOSTER BRAKE MECHANISM
Filed June 9, 1954  4 Sheets-Sheet 3

Fig-3-

INVENTOR
DAVID T. AYERS JR
BY John V. Phillips
ATTORNEY

July 29, 1958 — D. T. AYERS, JR — 2,844,941
BOOSTER BRAKE MECHANISM
Filed June 9, 1954 — 4 Sheets-Sheet 4

INVENTOR
DAVID T. AYERS JR.
BY John F. Phillips
ATTORNEY

United States Patent Office 2,844,941
Patented July 29, 1958

2,844,941
BOOSTER BRAKE MECHANISM

David T. Ayers, Jr., Birmingham, Mich., assignor to Kelsey-Hayes Company, a corporation of Delaware Application June 9, 1954, Serial No. 435,487

15 Claims. (Cl. 60—54.6)

This invention relates to a booster brake mechanism and is an improvement over the structure shown in my copending application Serial No. 432,416, filed May 26, 1954.

With the advent of accessory devices for motor vehicles such as hydraulically operated power steering mechanisms employing fluid circulating pumps, it has been found that such pumps readily may be utilized for hydraulically operating a booster motor for the brake mechanism of a motor vehicle. Such an apparatus is shown in my copending application referred to, the apparatus therein being applicable for use with either a static pressure or circulating fluid pump. The apparatus of the copending application has a feature in common with most booster brake mechanisms in that the operator in applying the brakes performs part of the work and the booster motor the remainder of the work in generating fluid pressures in the master cylinder for applying the brakes.

The apparatus is highly advantageous from several operational standpoints. For example, it permits the use of a low brake pedal and is so constructed as to provide low resistance to initial movement of the brake pedal from its normal off position. It also is so constructed that, upon a failure of power in the booster motor, the operator is relieved of the necessity for having to operate the piston of the booster motor against its frictional engagement with the cylinder and against the progressively increasing loading of the relatively heavy return spring which operates against the piston.

The principal object of the present invention is to provide an improved hydraulically operated booster brake mechanism which is particularly intended to be used in conjunction with a circulating fluid pump, the motor having two chambers in which pressures are normally balanced and wherein operation of the brake pedal disconnects one motor chamber from the other chamber for the building up of pressure in said one chamber to actuate the piston of the motor.

A further object is to provide a booster brake mechanism having all of the advantages of the structure of the copending application, several of which advantages are referred to above, except that the apparatus is particularly intended for use with a circulating fluid pump, the apparatus being improved from the standpoint of manufacturing and assembling and also from the standpoint of efficiency in operation.

Other objects and advantages of the invention will become apparent during the course of the following description.

In the drawing I have shown one embodiment of the invention. In this showing:

Figure 1:
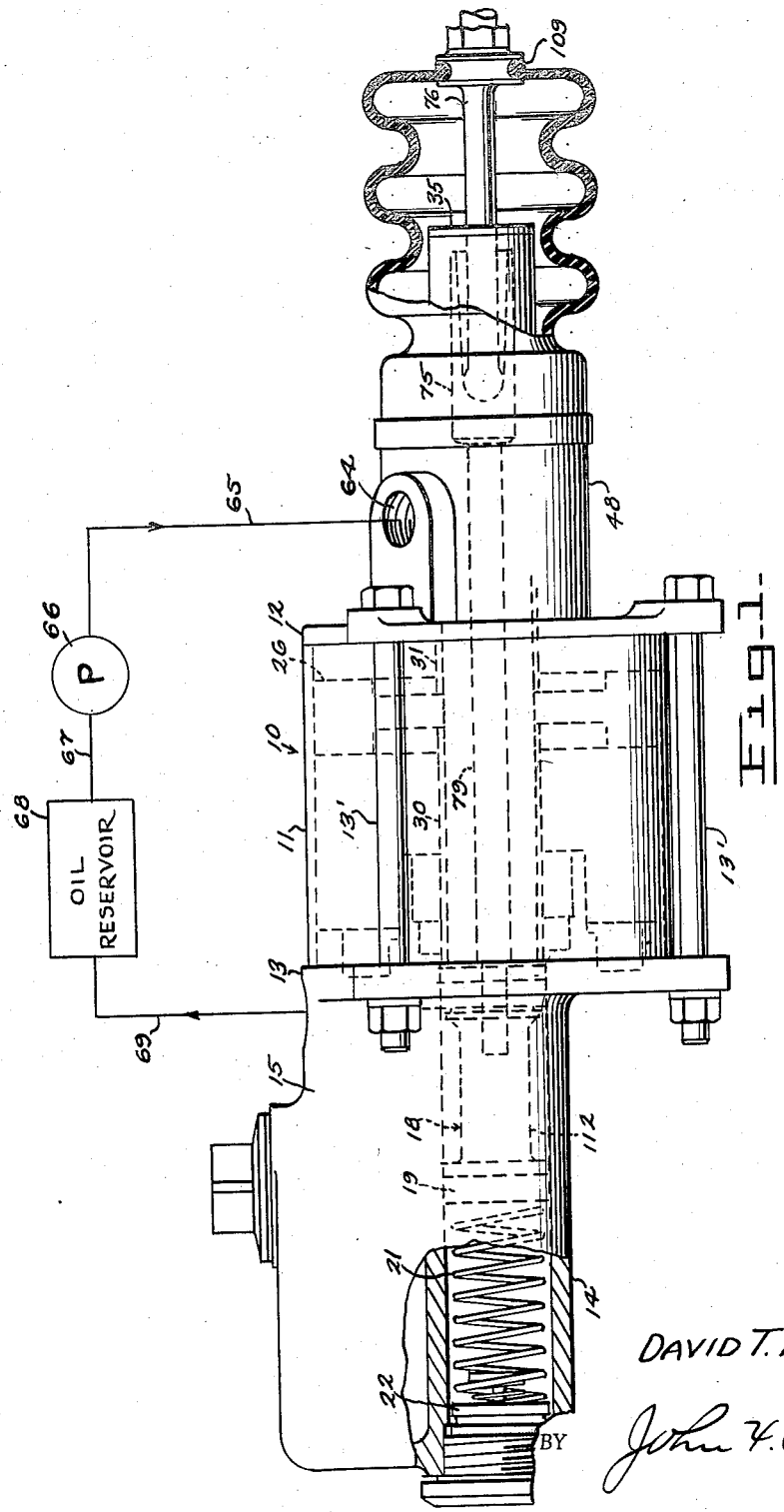
Figure 1 is a side elevation of the booster apparatus, parts being shown in section with the pump, oil reservoir and piping connections therefor diagrammatically illustrated.

Referring to the drawings, the numeral 10 designates a booster motor as a whole comprising a cylinder 11 which may be formed of tubular stock as distinguished from the cast cylinder of my copending application referred to. The cylinder 11 is closed at its ends by a pair of heads 12 and 13, secured together by bolts 13'. The head 13 is part of an integral casting which includes a master cylinder 14 and a reservoir 15 therefor, fluid being supplied from the reservoir to the master cylinder through the usual ports 16 and 17 arranged forwardly and rearwardly of a master cylinder piston indicated as a whole by the numeral 18. This piston is provided at its forward end with a seal 19 against which is arranged a spring seat 20 engaged by a return spring 21 which also operates in conjunction with a residual pressure valve shown generally in Figure 1 and indicated by the numeral 22.

The motor 10 is provided with a pressure responsive unit indicated as a whole by the numeral 25. This unit comprises a piston 26 having a seal 27 slidable in the cylinder 11, and the piston includes an inner annular flange 28 surrounding a generally tubular piston rod body 29. The flange 28 is fixed in position relative to the piston rod body 29 by relatively thin coaxial tubes 30 and 31, the adjacent ends of which seat against the flange 28. A nut 34 is threaded in the left-hand end of the piston rod body 29 as viewed in Figure 2. A similar nut 35 is threaded in the opposite end of the body 29, these nuts obviously serving to anchor the sleeves 30 and 31 in position with respect to the body 29 while at the same time the sleeves positively fix the piston 26 in position around the body 29.

The sleeve 30 has its left-hand end sliding in a suitable bearing and sealing means 38 including seal 39 which prevents leakage of hydraulic fluid around the sleeve 30. The sleeve 31 has its end adjacent the piston 26 sliding in a similar bearing and sealing means 40, such means including a bearing 41 having seals 42 and 43 on opposite sides thereof, and the seal 42 and bearing 41 are maintained in position by a nut 45. This nut is provided on its inner face with a radial passage 46 for a purpose to be described.

The piston rod structure extends substantially to the right, as viewed in Figure 1, from the bearing and sealing means 40 and passes through a housing 48 formed as a casting integral with the head 12. Within the housing 48 is formed a chamber 49. The outer or right-hand end of the chamber 49 is closed by a bearing and sealing means 50, which means includes a bearing 51 fixed in position by a nut 52 threaded in the outer end of the housing 48. Adjacent the inner face of the bearing 50 is arranged a seal 53 to prevent leakage of fluid from the chamber 49 around the sleeve 31. The seals 43 and 53 are maintained in position by a cylindrical spacer 56, perforated as at 57 for a purpose which will become apparent.

The piston 26 divides the cylinder 11 to form a pair of chambers 60 and 61. These chambers communicate with each other in the normal off positions of the parts for the free circulation of hydraulic fluid and the maintenance of equalized pressures in the motor chambers, the chamber 60 being disconnected from the chamber 61 during operation of the apparatus as described below.

The chamber 49 is provided with a hydraulic inlet 64 connected to a conduit 65 (Figure 1) leading from the outlet side of a circulating pump 66. The inlet side of this pump is connected to a pipe 67 leading from an oil reservoir 68 to which fluid is returned from the motor through a conduit 69 in a manner to be described. The pump 66 obviously functions to supply a constant flow of oil or other liquid to the chamber 49. Under the control of valve mechanism to be described, fluid circulates through the booster motor and from chamber 61, it flows through a port 70 in the head casting 13, thence outwardly through an outlet port 71 to the conduit 69.

The piston rod body 29 is provided with a cylindrical inner surface throughout its length, and in the right-hand end of the body 29 is slidable a plunger 75 engageable by a rod 76 connected to the vehicle brake pedal by any suitable means (not shown). The plunger 75 normally occupies the off position shown in Figure 2 and is moved to the left upon depression of the brake pedal, as will be apparent. Within the piston rod body 29 is slidable a sleeve valve 78 surrounding a rod 79 projecting entirely through and beyond the piston rod body 29 and actuated by the plunger 75. The valve 78 is of larger diameter than the rod 79 to provide between these elements a space 80 directly communicating at its left-hand end with a chamber 81 formed within the body 29. This chamber communicates through a port 82 with an annular space 83 formed around the body 29, and this space in turn communicates through ports 84 with the motor chamber 61. The latter motor chamber, accordingly, is always in communication with the space 80 surrounding the rod 79.

The valve 78 is provided with lands 86 and 87 adjacent one end spaced as at 88, and such space communicates through ports 89 with the space 80. The space 88 also normally communicates with an internal annular groove 92 formed in the piston rod body 29, this groove in turn communicating with the motor chamber 60 through cooperating ports 93 through the piston rod body 29 and through the sleeve 31.

Figure 2:
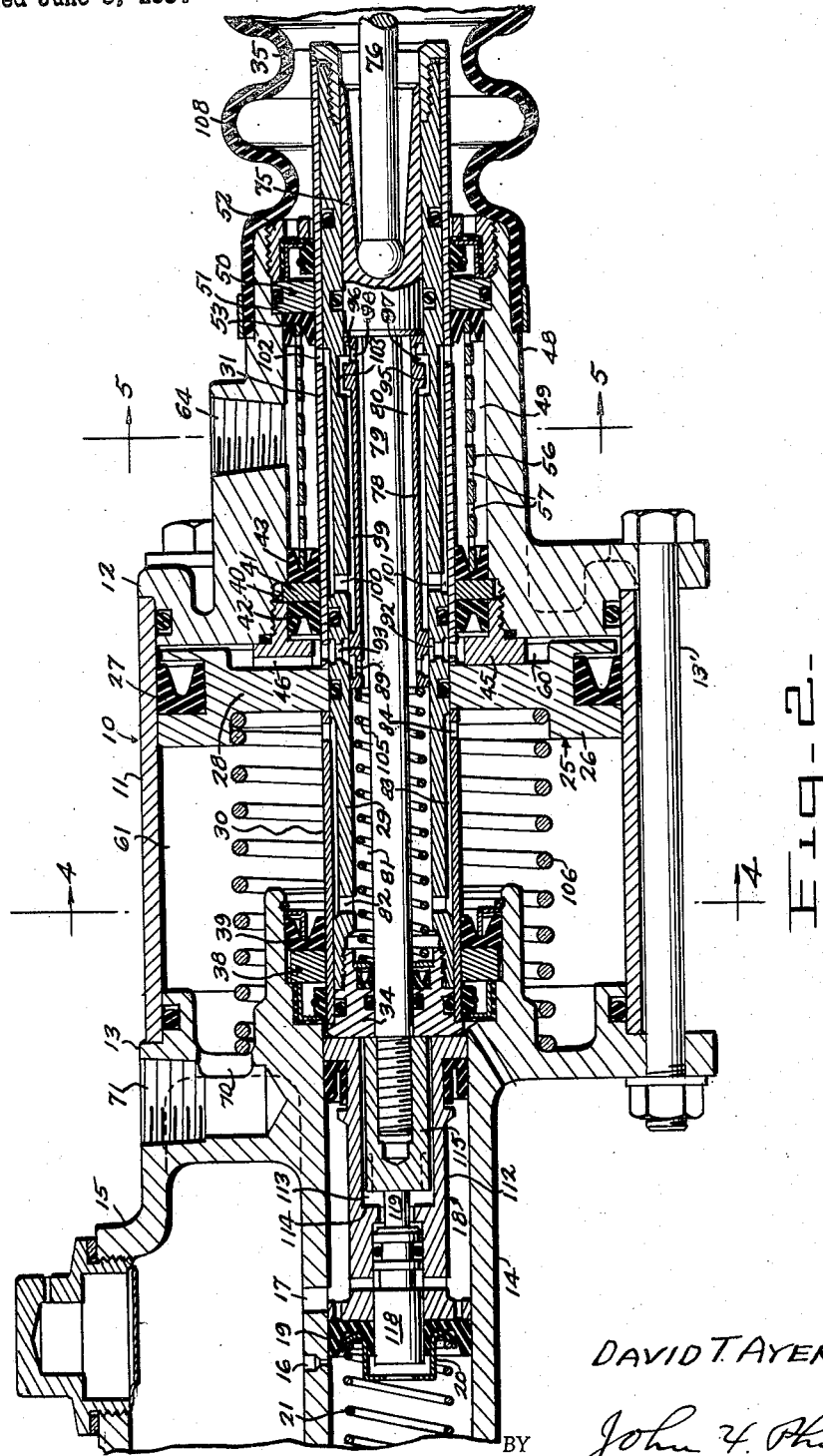
Figure 2 is a somewhat enlarged axial sectional view through the apparatus, parts being shown in elevation and parts being broken away and with the elements of the apparatus shown in the normal off positions of the parts.

The valve 78 adjacent its opposite end is provided with lands 95 and 96 having a space 97 therebetween communicating through ports 98 with the space 80 (Figure 2). The valve 78 is of reduced external diameter between the lands 87 and 95, thus providing an annular space 99 communicating through ports 100 with an external annular space 101 around the piston rod body 29. This space, in turn, communicates through ports 102 with the interior of the chamber 49. The land 95, in the normal positions of the parts, is centered with respect to an internal annular groove 103 formed in the piston rod body 29. This groove is substantially wider than the land 95 and when the latter is centered with respect to the groove, the space 99 communicates around the land 95 with the ports 98 and thus with the space 80. Under such conditions the chamber 49 communicates with the space 80 and chamber 81. In turn, the chamber 81 communicates with the motor chamber 60 through ports 89 and 93, and also communicates with the motor chamber 61 through ports 82, space 83 and ports 84. With the parts in the off positions shown in Figure 2, therefore, pumped fluid entering the chamber 49 circulates through the apparatus and leaves the motor chamber 61 through ports 70 and 71 to return to the oil reservoir through pipe line or conduit 69. Thus pressures in the motor will be balanced.

The valve 78 merely bears against the adjacent end of the plunger 75 and is urged to such position by a relatively light compression spring 105, the opposite end of which engages with elements associated with the nut 34 so that this nut takes the thrust of the spring. The spring 105 requires very light foot pressure for its operation and is much weaker than the return spring 106 which engages the piston 26 to urge the latter to its off position. It will become apparent that the operator is never called upon to exert pedal pressure to overcome the compression of the spring 106. As previously stated, the rod 76 is connected in any suitable manner to the brake pedal and a sealing boot 108 is connected at one end to the housing 48 and at its opposite end, as at 109 (Figure 1), to the rod 76.

The master cylinder piston 18 comprises an elongated body 112 having a deep axial recess 113 therein the inner end of which forms a shoulder 114. Within the recess 113 is mounted a head 115 threaded on the adjacent end of the rod 79. This head is smaller than the internal diameter of the recess 113 and normally is arranged with its end adjacent the shoulder 114 spaced from such shoulder to provide a lost motion connection between the pedal-operated parts and the master cylinder plunger for a reason which will become apparent. Movement of the rod 79 and head 115 to normal off positions is limited by engagement of the head 115 with the nut 34.

Projecting through the seal 19 and the adjacent end of the piston 18 is a plunger 118 having a stem 119 engaging the head 115. The plunger 118, when pressure is present in the master cylinder, reacts through head 115, rod 79, etc., to provide the brake pedal with "feel" proportional to master cylinder pressures.

*Operation*

Figure 3:
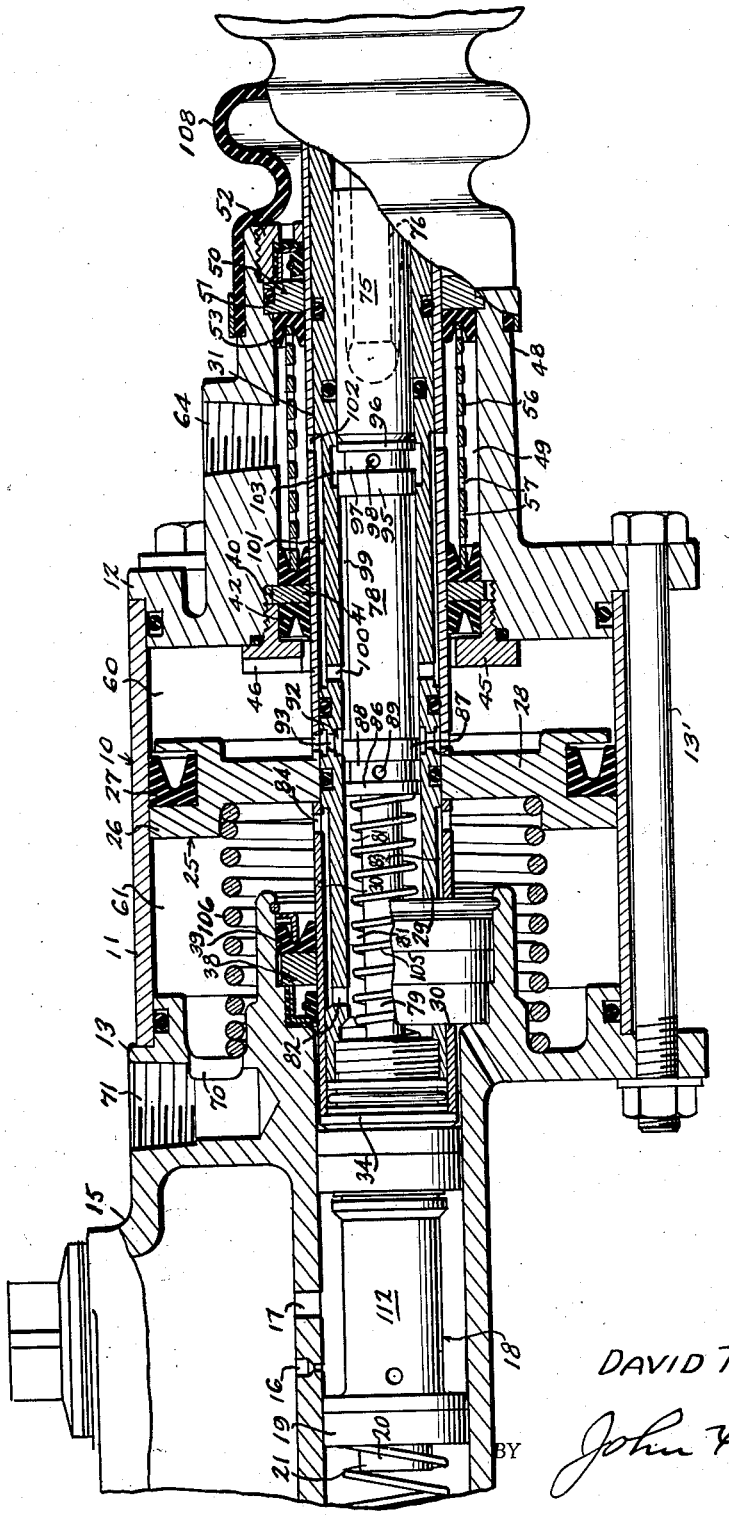
Figure 3 is a similar view showing the parts in the positions they will occupy during a brake application.
Figure 4:
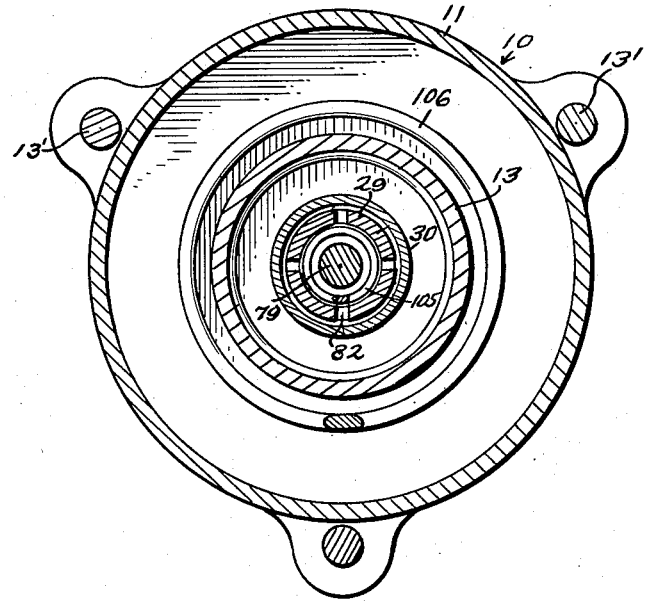
Figure 4 is a section on line 4—4 of Figure 2.

The parts normally occupy the positions shown in Figure 2. Under such conditions fluid from the pump 66 circulates through the apparatus in the manner previously described and returns to the reservoir 68 through conduit 69. When the brakes are to be applied, the pedal is depressed, thus moving the rod 79 to the left of its position shown in Figure 2. Initial movement of the plunger 79 moves the valve 78 to a position in which the left-hand edge of the land 95 (Figure 3) coincides with the left-hand edge of the groove 103, and the left-hand end of the land 87 coincides in position with the left-hand edge of the groove 92. The valve parts will now be in lap position, the space 99 being cut off from the groove 103 and the ports 89 being disconnected from the motor chamber 60. A very slight additional movement of the valve causes movement of the land 87, for example to the position shown in Figure 3, under which conditions the space 99 will communicate with the motor chamber 60 through groove 92 and ports 93. Fluid will then flow from the inlet chamber 49 through the perforated sleeve 56, and then through port 102, space 101, ports 100, space 99 and through groove 92 and ports 93 into the motor chamber 60 to build up pressure therein. The motor chamber 61 remains in communication with the oil reservoir as will be apparent, and the capacity of the chamber 61 accordingly is readily reducible as the piston 26 moves to the left.

Movement of the piston 26, by virtue of the abutting relationship of the nut 34 and master cylinder piston 18, will effect movement of the piston 18 to the left to displace fluid in the usual manner into the brake lines. Part of the work of applying the brakes will be provided by the motor and part by the plunger 118, movement of which is effected by pedal pressure. The valve mechanism operates to provide a follow-up action of the motor-operated parts relative to the pedal-operated parts, and the shoulder 114 (Figure 2) runs in advance of and out of contact with the head 115 until the point of "power run-out" of the motor occurs. This is the point at which pressure in the motor chamber 60 corresponds to the maximum pressure which can be developed by the pump 66. Beyond such point, the head 115 directly engages the shoulder 114, after which pedal pressure assists the booster motor in providing for a maximum brake application if this is necessary.

Movement of the parts in a retractile operation thereof upon releasing of the brake pedal will be apparent. The spring 105 will return the valve 78 and other pedal-operated parts to their normal off positions shown in Figure 2, whereupon communication will be reestablished between chambers 49, 60 and 61 for the normal circulation of hydraulic fluid through the motor. Substantially balanced pressures will now occur in the motor chambers 60 and 61, and the spring 106 will return the piston 26 to its normal off position shown in Figure 2. Movement of the piston to off position is limited by the nut 45 which is grooved as at 46 to insure full communication in the off positions of the parts between the ports 93 and motor chamber 60.

Figures 5, 6:
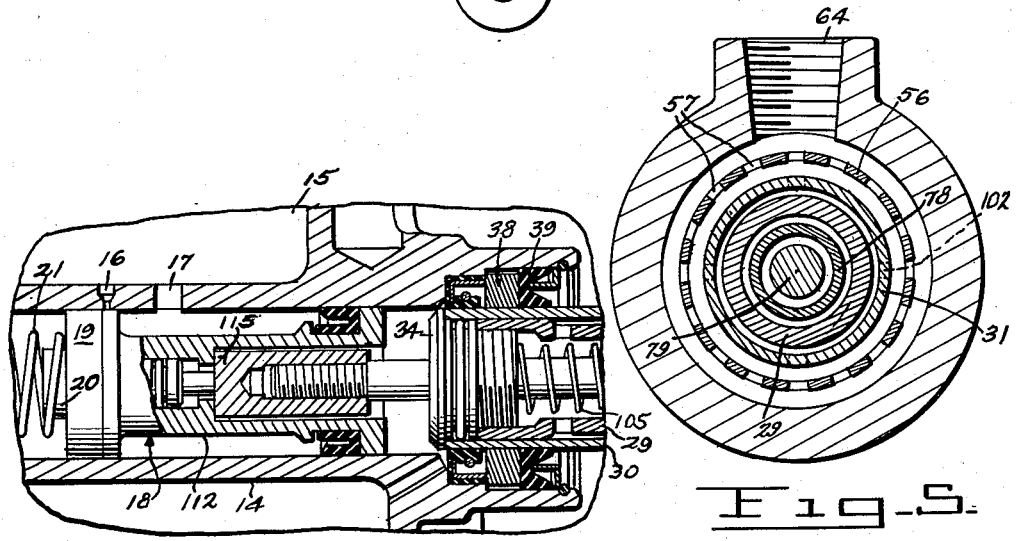
Figure 5 is a similar view on line 5—5 of Figure 2.
Figure 6 is a fragmentary sectional view, parts being shown in elevation, indicating the positions of the parts when the master cylinder piston is pedal actuated during a failure of power in the booster motor.

Assuming that there is a failure of power in the pump 66 and the operator desires to apply the brakes, the pedal will be depressed in the usual manner and the pedal-operated parts will move to the left as in the previously described case. However, when the valve parts move to motor-energizing positions, the piston 28 will remain in its normal off position. It will be apparent that the rod 79 is slidable through the nut 34, and when no power is available for motor operation of the master cylinder piston 18, the head 115 will advance into solid contact with the shoulder 114, and the master cylinder piston will be moved solely by pedal pressure. The right-hand end of the piston 18 then moves away from the nut 34, the parts now assuming the positions shown in Figure 6.

Whereas in earlier constructions brake application, upon a failure of power for the booster motor, was accomplished only by transmitting manual movement to the booster motor piston, such piston in the present case remains stationary. A far more effective manual application of the brakes can be accomplished since the operator is relieved of expending work in compressing the spring 106, the force of which builds up as it is compressed, and the operator also is relieved from having to overcome the friction of the seal 27 in the cylinder 11. Except for negligible friction, therefore, all of the force exerted by the operator on the brake pedal is utilized for applying the brakes.

The present construction is advantageous for a number of reasons. For example, the fluid inlet and outlet ports are formed in the castings 12 and 13, and this permits the use of tubular steel stock in the making of the cylinder 11, it being unnecessary that such cylinder be cast. This tubular stock can be cut off to lengths according to the pistol travel desired, and the two castings 12 and 13 are readily connected in position with respect to the cylinder 11. The sleeves 30 and 31 cooperate with the piston body 29 to form fluid ports and passages, and they serve also to fix the piston 26 in position longitudinally of the piston rod structure. The parts are capable of quick and easy assembly, and the device operates with a high degree of efficiency and dependability.

It is to be understood that the form of the invention illustrated and described is to be taken as a preferred example of the same and that the scope of the invention is defined in the appended claims.

I claim:

1. A booster brake mechanism comprising a motor having a cylinder and a pressure responsive unit therein, a pair of heads connected to the ends of said cylinder, a master cylinder carried by one of said heads and having a fluid displacing piston therein, said one head having a fluid discharge port therethrough communicating with one end of said motor cylinder, an inlet passage formed in the other head, means connected for supplying fluid under pressure to said inlet passage, a rod slidable through said pressure responsive unit and having a force transmitting head at one end provided with lost motion connection with said master cylinder piston, and a valve surrounding and spaced from said rod to form therewith a fluid passage normally communicating with said inlet passage and with both ends of said motor cylinder, said valve and said pressure responsive unit having portions cooperating, upon movement of said valve from a normal position, for disconnecting the ends of said cylinder from each other and connecting said other end of said cylinder to said inlet passage, said pressure responsive unit having mechanical connection with said master cylinder piston to impart movement to the latter when said motor is energized.

2. Apparatus according to claim 1 wherein the mechanical connection between said pressure responsive unit and said master cylinder piston is in the form of an abutting contact whereby said master cylinder piston is movable away from said pressure responsive unit, upon a failure of fluid pressure for said motor, when movement is imparted to said master cylinder piston by said force transmitting head.

3. Apparatus according to claim 1 wherein said master cylinder piston is provided with a plunger having one end subject to pressures in said master cylinder and having its other end engaging said force transmitting head to transmit to said rod reaction pressures proportional to pressures in said master cylinder.

4. A booster brake mechanism comprising a motor having a cylinder and a pressure responsive unit therein, a head closing each end of said cylinder, one of said heads being provided with a master cylinder having a fluid displacing piston therein, said pressure responsive unit comprising a piston reciprocable in said cylinder, and a tubular body having a bore therethrough, a pair of sleeves surrounding said tubular body and engaging at their adjacent ends against said motor piston to fix it in position longitudinally of said tubular body, securing means for fixing each of said sleeves to said tubular body, one of said securing means being at the end of said pressure responsive unit adjacent said master cylinder piston and having abutting relation therewith, a rod extending through said tubular body and having a head at one end engaging said one securing means when said rod is in a normal off position, said head being engageable with said master cylinder piston upon movement a predetermined distance from its normal off position, a valve surrounding said rod and spaced therefrom to form a fluid passage in fixed communication with said one end of said motor cylinder, the sleeve remote from said master cylinder cooperating with said tubular body to form an annular space, a source of pressure fluid communicating with such space, said valve having a land normally connecting said annular space and said fluid passage only when said valve is in a normal off position, port means affording communication between said fluid passage and the other end of said motor cylinder when said valve is in its normal off position, said valve having a second land movable to close said port means to said passage and to open it to communication with said annular space when said valve is moved from said normal off position.

5. Apparatus according to claim 4 wherein said valve is movable less than said predetermined distance to energize said motor, and a plunger carried by said master cylinder piston and having one end open to fluid pressure in said master cylinder and its other end in engagement with said head to transmit to said rod reaction pressures proportional to pressures in said master cylinder.

6. A booster brake mechanism comprising a hydraulic motor having a cylinder of uniform cross section from end to end and a pressure responsive unit therein heads closing the ends of said cylinder, one of said heads having a master cylinder and a fluid displacing piston therein, said one head being provided with a fluid outlet port communicating with the adjacent end of said motor cylinder for the free flow of hydraulic fluid therefrom, said pressure responsive unit comprising a piston reciprocable in said motor cylinder, and a tubular body, a pair of sleeves surrounding said body at opposite sides of said motor piston and having adjacent ends engaging such piston to fix it in position longitudinally of said tubular body, nuts threaded in the ends of said tubular body and engaging the remote ends of said sleeves to fix them in position, one of said nuts abutting said master cylinder piston whereby movement of said pressure responsive unit in one direction will move said master cylinder piston and whereby the latter is movable in such direction independently of said motor piston, a manually operable rod projecting axially through said tubular body and having lost motion connection with said master cylinder piston, the other motor head having a hydraulic fluid inlet chamber and being provided with a hydraulic fluid inlet port, and a follow-up valve device connected to be movable with said rod and normally occupying an off position affording communication of said inlet chamber with both ends of said motor and being movable within the limits of said lost motion connection to disconnect said other end of said motor cylinder from said adjacent end thereof and connect said other end of said motor cylinder with said inlet chamber.

7. Apparatus according to claim 6 wherein the end of said master cylinder piston abutting said one nut is provided with an axial recess, a head in said axial recess fixed to said rod, said head having one end abutting said one nut when said rod is in its normal off position, said lost motion connection being formed by spacing the other end of said head from the inner limit of said recess.

8. Apparatus according to claim 6 wherein the end of said master cylinder piston abutting said one nut is provided with an axial recess, a head in said axial recess fixed to said rod, said head having one end abutting said one nut when said rod is in its normal off position, said lost motion connection being formed by spacing the other end of said head from the inner limit of said recess, and a plunger of substantially smaller diameter than and axially slidable in said master cylinder piston, said plunger having one end subject to pressures in said master cylinder and having its other end projecting into said recess and engaging said head.

9. Apparatus according to claim 6 wherein said valve device comprises a cylindrical valve slidable in said tubular body and surrounding said rod, said valve having a first annular land arranged when said valve is in a normal off position to afford communication between said inlet chamber and said adjacent end of said motor cylinder, said valve, said tubular body and one of said sleeves having port means affording communication between the ends of said motor cylinder, said valve having a second annular land movable to close said port means and open communication between said other end of said motor cylinder and said inlet chamber when said valve is moved from its normal off position, said first land, in such movement of said valve, closing communication between said inlet chamber and said adjacent end of said motor cylinder.

10. Apparatus according to claim 6 wherein said valve device comprises a cylindrical valve slidable in said tubular body and surrounding said rod, said valve having a first annular land arranged when said valve is in a normal off position to afford communication between said inlet chamber and said adjacent end of said motor cylinder, said valve, said tubular body and one of said sleeves having port means affording communication between the ends of said motor cylinder, said valve having a second annular land movable to close said port means and open communication between said other end of said motor cylinder and said inlet chamber when said valve is moved from its normal off position, said first land, in such movement of said valve, closing communication between said inlet chamber and said adjacent end of said motor cylinder, said movement of said valve taking place within the limits of said lost motion connection between said rod and said master cylinder piston, and means connected to be operable in any relative position of said rod and said master cylinder piston for transmitting from said master cylinder to said rod reaction forces proportional to pressures in said master cylinder.

11. Apparatus according to claim 6 wherein said valve device comprises a cylindrical valve slidable in said tubular body and surrounding said rod, said valve having a first annular land arranged when said valve is in a normal off position to afford communication between said inlet chamber and said adjacent end of said motor cylinder, said valve, said tubular body and one of said sleeves having port means affording communication between the ends of said motor cylinder, said valve having a second annular land movable to close said port means and open communication between said other end of said motor cylinder and said inlet chamber when said valve is moved from its normal off position, said first land, in such movement of said valve, closing communication between said inlet chamber and said adjacent end of said motor cylinder, said master cylinder piston having an axial recess in the end thereof adjacent said one nut and provided at its inner extremity with a shoulder, a head carried by said rod in said recess, one end of said head, in the off position of said rod, engaging said one nut, the other end of said head being spaced from said shoulder in the off position of said rod and forming the lost motion connection between said rod and said master cylinder piston, such space being greater than the movement of said first land for closing communication between said inlet chamber and said one end of said motor cylinder.

12. Apparatus according to claim 6 wherein said valve device comprises a cylindrical valve slidable in said tubular body and surrounding said rod, said valve having a first annular land arranged when said valve is in a normal off position to afford communication between said inlet chamber and said adjacent end of said motor cylinder, said valve, said tubular body and one of said sleeves having port means affording communication between the ends of said motor cylinder, said valve having a second annular land movable to close said port means and open communication between said other end of said motor cylinder and said inlet chamber when said valve is moved from its normal off position, said first land, in such movement of said valve, closing communication between said inlet chamber and said adjacent end of said motor cylinder, said master cylinder piston having an axial recess in the end thereof adjacent said one nut and provided at its inner extremity with a shoulder, a head carried by said rod is said recess, one end of said head, in the off position of said rod, engaging said one nut, the other end of said head being spaced from said shoulder in the off position of said rod and forming the lost motion connection between said rod and said master cylinder piston, such space being greater than the movement of said first land for closing communication between said inlet chamber and said one end of said motor cylinder, and a reaction plunger slidable in said master cylinder piston, said plunger having one end open to pressure fluid in said master cylinder and having its other end in constant engagement with said head.

13. A booster brake mechanism comprising a hydraulic motor having a cylinder and a pressure responsive unit therein, heads closing the ends of said cylinder, one of said heads having a master cylinder and a fluid displacing piston therein and being provided with a fluid outlet port communicating with the adjacent end of said motor cylinder for the free flow of hydraulic fluid therefrom, the other of said heads being provided with a fluid inlet chamber adapted to be connected to a source of hydraulic fluid pressure, said pressure responsive unit comprising a piston, a piston rod projecting therethrough and sleeves surrounding said piston rod at opposite sides of said piston and engaging the latter to position it longitudinally of said piston rod, a manually operable rod projecting through said piston rod and having mechanical engagement with said master cylinder piston, said piston rod having abutting contact with said master cylinder piston to cooperate with said manually operable rod in moving said master cylinder piston, and a valve device comprising a valve connected to be operable by said manually operable rod and having a normal position connecting both ends of said motor cylinder with each other and with said inlet chamber and being movable in one direction from such position to an operative position to disconnect said adjacent end of said motor cylinder from the other end of said motor cylinder and from said inlet chamber and to connect said inlet chamber to said other end of said motor cylinder.

14. A booster brake mechanism according to claim 13 wherein said manually operable rod has lost motion connection with said master cylinder piston within the limits of which lost motion said valve is movable to said operative position, and means connected for transmitting from said master cylinder to said manually operable rod reaction forces proportional to hydraulic pressures in said master cylinder.

15. A booster brake mechanism comprising a motor having a cylinder provided with a pressure responsive unit therein dividing said cylinder to form a pair of motor chambers, one of which is an outlet chamber, a pair of heads connected to the ends of said cylinder, a master cylinder carried by the one of said heads adjacent said outlet chamber and having a fluid displacing piston therein, an inlet passage formed in the other head, a rod slidable through said pressure responsive unit and having a force transmitting head at one end provided with lost motion connection with said master cylinder piston, and a valve surrounding and spaced from said rod to form therewith a fluid passage normally communicating with said inlet passage and with both of said motor chambers, said valve and said pressure responsive unit having portions cooperating, upon movement of said valve from a normal position, for disconnecting said motor chambers from each other and for connecting the other of said motor chambers to said inlet passage, said pressure responsive unit having mechanical connection with said master cylinder piston to impart movement to the latter when said motor is energized, and a constantly operating pump having an outlet in communication with said inlet passage and an inlet communicating with said outlet chamber whereby, when said valve is normally positioned, there will be a constant flow of hydraulic fluid through said motor.

References Cited in the file of this patent

UNITED STATES PATENTS

| | | |
|---|---|---|
| 2,006,487 | Sorensen | July 2, 1935 |
| 2,130,799 | Hofstetter | Sept. 20, 1938 |
| 2,165,942 | Rossmann | July 11, 1939 |
| 2,458,803 | Stelzer | Jan. 11, 1949 |
| 2,532,960 | Stelzer | Dec. 5, 1950 |
| 2,642,165 | Banker | June 16, 1953 |
| 2,685,171 | Price | Aug. 3, 1954 |
| 2,685,172 | Price | Aug. 3, 1954 |